(12) United States Patent
Greene et al.

(10) Patent No.: US 9,979,491 B2
(45) Date of Patent: May 22, 2018

(54) SUBSEA POWER-OVER-FIBER CAN BUS CONVERTER

(71) Applicant: Teledyne Instruments, Inc., Thousand Oaks, CA (US)

(72) Inventors: Michael Greene, Palm Bay, FL (US); Huijiang Xi, Maitland, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days. days.

(21) Appl. No.: 15/273,311

(22) Filed: Sep. 22, 2016

(65) Prior Publication Data
US 2018/0083715 A1 Mar. 22, 2018

(51) Int. Cl.
*H04B 10/40* (2013.01)
*H04B 10/80* (2013.01)
*H04L 12/40* (2006.01)
*H04B 10/50* (2013.01)

(52) U.S. Cl.
CPC ........... *H04B 10/806* (2013.01); *H04L 12/40* (2013.01); *H04B 10/503* (2013.01); *H04L 2012/40215* (2013.01)

(58) Field of Classification Search
CPC ..... H04B 10/503; H04B 10/806; H04L 12/40; H04L 2012/40215
USPC ......................................................... 398/104
See application file for complete search history.

(56) References Cited

U.S. PATENT DOCUMENTS

| 4,616,900 A | 10/1986 | Cairns |
| 4,682,848 A | 7/1987 | Cairns et al. |
| 4,795,359 A | 1/1989 | Alcock et al. |
| 4,928,319 A | 5/1990 | Pitt et al. |
| 5,099,144 A | 3/1992 | Sai |
| 5,119,679 A | 6/1992 | Frisch |
| 5,194,012 A | 3/1993 | Cairns |

(Continued)

FOREIGN PATENT DOCUMENTS

EP      2713191 A1 * 4/2014 ............... F16L 1/12

OTHER PUBLICATIONS

RLH Industries, Inc., Power Over Fiber System, 2015.
(Continued)

*Primary Examiner* — Dalzid Singh
(74) *Attorney, Agent, or Firm* — Duncan Galloway Egan Greenwald, PLLC; Kevin T. Duncan (57) ABSTRACT

Messages on controller area network (CAN) buses are communicated over subsea links to subsea devices that also require electrical power to function. These subsea devices may be disposed kilometers away from the signal source where electrical signal and power transmission is impractical. The present invention provides a subsea power-over-fiber CAN bus converter for converting CAN bus electrical input and electrical power input into optical signals for transmission over a fiber optic cable for conversion into CAN bus electrical output and electrical power output for use by a subsea sensor or other subsea device. The subsea power-over-fiber CAN bus converter of the present invention is may comprise a flying lead harness that has a first connector end, a second connector end, a first optical converter module, a second optical converter module, and a fiber optic cable disposed between the first and second optical converter modules.

20 Claims, 3 Drawing Sheets

(56) References Cited

U.S. PATENT DOCUMENTS

| | | |
|---|---|---|
| 5,645,442 A | 7/1997 | Cairns |
| 5,664,035 A | 9/1997 | Tsuji et al. |
| 5,685,727 A | 11/1997 | Cairns |
| 5,738,535 A | 4/1998 | Cairns |
| 5,796,890 A | 8/1998 | Tsuji et al. |
| 5,838,857 A | 11/1998 | Niekrasz |
| 6,315,461 B1 | 11/2001 | Cairns |
| 6,736,545 B2 | 5/2004 | Cairns et al. |
| 7,359,647 B1 | 4/2008 | Faria et al. |
| 7,660,534 B2 | 2/2010 | Al-Chalabi |
| 7,695,301 B2 | 4/2010 | Mudge et al. |
| 7,696,901 B2 | 4/2010 | Wilson et al. |
| 7,813,646 B2 | 10/2010 | Furey |
| 8,734,026 B2 | 5/2014 | Nagengast et al. |
| 9,057,846 B2 | 6/2015 | Xi |
| 9,097,861 B2* | 8/2015 | Hatcher ............... G02B 6/3816 |
| 9,203,640 B2 | 12/2015 | Xi et al. |
| 2004/0008996 A1 | 1/2004 | Aronson et al. |
| 2005/0226625 A1* | 10/2005 | Wake ............... H04B 10/25753 |
| | | 398/115 |
| 2008/0277565 A1 | 11/2008 | Bookbinder et al. |
| 2009/0028566 A1* | 1/2009 | Abbott ................ H04B 10/038 |
| | | 398/83 |
| 2010/0183313 A1* | 7/2010 | Rhodes ................ H04B 13/02 |
| | | 398/104 |
| 2012/0175969 A1* | 7/2012 | Maughan ................ H01F 38/14 |
| | | 307/104 |
| 2013/0044983 A1* | 2/2013 | Nagengast .......... E21B 33/0385 |
| | | 385/77 |
| 2014/0254994 A1 | 9/2014 | Cho et al. |
| 2014/0376599 A1* | 12/2014 | Xi ........................ H04L 12/40 |
| | | 375/211 |

OTHER PUBLICATIONS

RP Photonis Encyclopedia, Power Over Fiber.
Sue Holmes, Developing Power-Over-Fiber Communications Cable: When Total Isolation is a Good Thing, Sandia Corporation, Jan. 18, 2012.
Anna Basanskaya, Electricity Over Glass: A Major Fiber-Optics Firm Buys Into Transmitting Power With Light, Oct. 1, 2005.
Ben Coxworth, Hybrid Fiber Optic Cable Carries Data and Power, Feb. 3, 2012.

* cited by examiner

SUBSEA POWER-OVER-FIBER CAN BUS CONVERTER

FIELD OF THE INVENTION

The present invention relates to the field of communication buses and, in particular, to systems and methods for providing power and communications signals to controller area network ("CAN") bus devices in a CAN bus network.

BACKGROUND

Subsea systems, such as those used in exploration and production of oil and gas, continue to increase in complexity. A subsea well can include sensors and actuators located at or below the sea floor. The sensors can be, for example, pressure sensors, temperature sensors, and erosion detectors. The actuators can be, for example, valves, pumps, and other flow control devices. Information from the sensors is commonly communicated with other subsea facilities and then communicated with or processed by equipment at a surface facility. Similarly, controls for the actuators commonly originate at a surface facility. Accordingly, communication is needed between the subsea devices and equipment at the surface. These devices may be spread over a wide area and may also be subject to harsh conditions such as high pressure and temperatures.

In offshore drilling and production operations, equipment is often subjected to harsh conditions thousands of feet under the sea surface with working temperatures of −50° F. to 350° F. with pressures of up to 15,000 psi. Subsea control and monitoring equipment commonly are used in connection with operations concerning the flow of fluid, typically oil or gas, out of a well. Flow lines are connected between subsea wells and production facilities, such as a floating platform or a storage ship or barge. Subsea equipment includes sensors and monitoring devices (such as pressure, temperature, corrosion, erosion, sand detection, flow rate, flow composition, valve and choke position feedback), and additional connection points for devices such as down hole pressure and temperature transducers. A typical control system monitors, measures, and responds based on sensor inputs and outputs control signals to control subsea devices. For example, a control system attached to a subsea tree controls down-hole safety valves. Functional and operational requirements of subsea equipment have become increasingly complex along with the sensing and monitoring equipment and control systems used to insure proper operation.

To connect the numerous and various sensing, monitoring and control equipment necessary to operate subsea equipment, harsh-environment connectors are used with electrical cables, optical fiber cables, or hybrid electro-optical cables. There exists a variety of wet-mate and dry-mate electrical and optical connectors that may be employed in subsea communication systems.

To facilitate communication between these underwater devices, and between different communication mediums and network types, systems and control device are employed to manage the subsea equipment. Subsea communication may be implemented by fiber optic, electrical, or hybrid optical-electric communication systems. Fiber optic communication systems typically employ one or more optical fibers, while electrical communication systems employ copper wire which may be implemented as a twisted pair. Communication between devices and pieces of equipment may be on a TCP/IP network and may be handled by one or more modems, switches, routers, and control apparatuses.

Controller area network ("CAN") buses are used to interconnect sensors, actuators, controllers, and other devices in applications such as automobiles, industrial automation, and medical equipment. Many circuits and devices have been developed for CAN bus communications. However, current CAN bus based subsea systems face several limitations. Network size is restricted due to the impedance drop that results from connecting multiple electrical devices in parallel. Additionally, conventional driver components may not be suitable for long transmission lines. One system and method for controlling optical CAN bus systems is described in SYSTEMS AND METHODS FOR SUBSEA OPTICAL CAN BUSES, Xi, U.S. Pat. No. 9,057,846, issued Jun. 16, 2015, and one cable that may be used in such a system is described in SUBSEA ELECTRO-OPTICAL CONNECTOR UNIT FOR ELECTRO-OPTICAL ETHERENET TRANSMISSION SYSTEM, Nagengast et al., U.S. Pat. No. 8,734,026, issued May 27, 2014, both of which are hereby incorporated by reference in their entirety.

In a typical subsea communication network having a plurality of wellheads a large subsea control module is employed to manage and facilitate communications between one or more subsea devices and other equipment on the surface over a CAN bus network. These subsea devices and other equipment may include devices such as sensors, sensor modules, or other similar monitoring devices. These devices typically require both electrical power and an CAN bus signal in order to function and communicate with other devices, such as the subsea control module, on the CAN bus network. For example, a sensor monitoring pressure at a wellhead will need a CAN bus connection, which is typically an electrical connection, to send and receive data to other devices, such as a subsea control module, on the CAN bus network. The sensor will also need electrical power to operate. While sensors may be low or very low power devices drawing little current, battery power is typically not an option as replacing or re-charging batteries on a subsea sensor is not practical or efficient. Additionally, in many systems electrical power is not available at the location of the sensor and must be provided to the sensor from the subsea control module or a power module located at the subsea control module.

Problems exist with these typical configurations wherein electrical power is provided to the sensor from the subsea control module. First, when the sensor is at a great distance from the subsea control module providing electrical power over a conductive wire or cable may be costly. Laying a conductive wire or cable on the sea bed and connecting a conductive wire or cable to the sensor may be impractical over distances of hundreds of meters or even kilometers. A conductive wire or cable of that length would be expensive to produce, heavy, and costly to repair or replace. Additionally, the conductive wire or cable would typically be part of or comprise a larger cable that also included the CAN bus connection, typically a twisted pair electrical connection. Providing both the power and the signal in the same cable may cause electromagnetic interference, and both the power and CAN bus signal may experience signal or power loss over longer cable lengths. The interference and signal loss problems increase proportionally along with the length of the cable. Some existing systems have partially overcome this problem by transmitting the CAN bus signal as an optical signal over an optical fiber. However, these systems still rely on a conductive wire or cable to transmit electrical power to the sensor.

What is needed is a system or device for providing both electrical power and a CAN bus signal over a great distance without the use of a conductive wire or cable.

SUMMARY

The present invention provides a system and apparatus for a subsea power-over-fiber CAN bus converter. The present invention provides for sending CAN bus signals long distances over an optical fiber while also providing electrical power over an optical fiber. The present invention may take the form of a flying lead harness and may comprise a set of optical converter units for converting electrical input signals and electrical power inputs into optical signals for transmission and conversion into electrical output signals and electrical power output for use by a subsea sensor or other device. Moreover, the optical converter modules of the present invention are disposed within atmospheric housings adapted to withstand large pressure and temperature differentials and extremes in pressure and temperature while maintaining an optimal interior operating environment for the optical converter module components. Ambient pressure at the sea floor or operating depths may be as high as 15,000 psi. A high differential pressure is when the pressure inside a vessel or pressure chamber is significantly different than the pressure on the exterior of the vessel or pressure chamber, especially at a bulkhead, such as a difference in pressures of an order of magnitude or greater. For example, a low internal pressure and a high external pressure or vise versa. In one embodiment the atmospheric housing of the present invention is adapted to maintain an internal pressure of 1 Atmosphere (~15 psi) when exposed to an ambient external pressure of up to 1020 Atmospheres (~15,000 psi). In other embodiments the housing may be adapted to maintain an internal pressure between 0.5-10 Atmospheres (~7-146 psi) and withstand external pressures of 1-1020 Atmospheres (~15-15,000 psi), or withstand differential pressures of 1,000 to 10,000 psi, depending on the application and depth below sea level at which the invention will be used.

The present invention provides for the conversion by a first optical converter module of CAN bus input signals, which may be CAN− and CAN+ signals, into optical signals for transmission via an optical fiber. The present invention also provides for the conversion by the first optical converter module of electrical input power for transmission as optical signals by a laser diode via an optical fiber. The CAN bus optical signals and the optical signals of the converted electrical input are received by a second optical converter module which converts these optical signals into electrical outputs to supply to a device such as a subsea sensor.

The use of the present invention in a subsea CAN bus network provides for the placement of sensors and other subsea devices at positions kilometers away from a subsea control module. In existing systems, relays and other intermediate devices must be used when placing sensors so far from the subsea control module source. Also, in traditional systems providing electrical power to these sensors and other devices is problematic because of the cost involved and issues posed by interference and signal loss.

With the present invention these problems are overcome by transmitting both power and CAN bus signals via optical fiber. At the first optical converter module, the power signal is transmitted by a laser diode over an optical fiber. The high power optical signal from this laser diode is received at a photodetector in the second optical converter module. The photodetector provides a current which is converted to a voltage and may be stored or directly transmitted to a subsea sensor or other device.

The subsea power-over-fiber CAN bus converter system of the present invention may also be used or combined with CAN bus repeaters such as those described in LONG DISTANCE SUBSEA CAN BUS REPEATER CABLE, Huijiang Xi et al., U.S. Pat. No. 9,203,640, issued Dec. 1, 2015, to extend the range of the CAN bus system, and with optical to electrical distribution hubs such as those described in SYSTEM, METHOD, AND APPARATUS FOR SUBSEA OPTICAL TO ELECTRICAL DISTRIBUTION, Michael Greene et al., U.S. patent application Ser. No. 15/069,644, filed Mar. 14, 2016, both of which are hereby incorporated by reference in their entirety. The subsea power-over-fiber CAN bus converter system of the claimed invention may also be used with other CAN bus system components including existing optical cables, electrical cables, Ethernet cables, bulkhead and electrical penetrators, and other components typically used in CAN bus networks.

In a first embodiment, the present invention provides a subsea power-over-fiber control area network ("CAN") bus converter system comprising: a first optical converter unit comprising a first signal module and a first power module, the first signal module comprising a first CAN bus and a first CAN bus signal optical transceiver, the first power module comprising a laser diode, wherein the first optical converter unit is disposed within a first atmospheric housing adapted to withstand high differential pressures; a second optical converter unit comprising a second signal module and a second power module, the second signal module comprising a second CAN bus and a second CAN bus signal optical transceiver, the second power module comprising at least one photodetector, wherein the second optical converter unit is disposed within a second atmospheric housing adapted to withstand high differential pressures; and a fiber optic cable comprising a first optical fiber and a second optical fiber, the first optical fiber connected at a first end to the first signal module through the first atmospheric housing by a first fiber penetrator and at a second end to the second signal module through the second atmospheric housing by a second fiber penetrator, the second optical fiber connected at a first end to the first power module through the first atmospheric housing by a third fiber penetrator and at a second end to the second power module through the second atmospheric housing by a fourth fiber penetrator.

The system of the first embodiment may further comprise wherein the first power module further comprises a set of high power laser diode drivers. The second power module may further comprise a current to voltage converter circuit, a capacitor bank, and a sensor power unit. The system may further comprise a subsea control module and a sensor. The subsea control module may further comprise a power supply and a CAN bus module, the power supply adapted to provide power to the first power module of the first optical converter, the CAN bus module providing a first electrical CAN signal to the first signal module of the first optical converter. The sensor may further comprise at least one electrical instrument and a CAN bus module, the CAN bus module adapted to communicate by a second electrical CAN signal with the second signal module of the second optical converter, the at least one electrical instrument connected to and powered by the second power module of the second optical converter. The first optical converter module may be adapted to: receive the first electrical CAN signal from the subsea control module; convert the first electrical CAN signal into a first optical CAN signal; and transmit the first optical CAN signal to the second optical converter module. The second optical converter module may be adapted to receive the first optical CAN signal; convert the first optical CAN signal into the second electrical CAN signal; and transmit the second electrical CAN signal to the sensor. The system may be adapted to send and receive a set of CAN signals from the subsea control module to the sensor via the first optical converter module, the second optical converter module, and the fiber optic cable. The laser diode of the first optical converter module may be adapted to emit a laser light via the fiber optic cable that when received at the at least one photodetector in the second optical converter module is converted into an electrical current. The electrical current may be used to power a sensor without the use of an additional electrical power source. The first fiber optic penetrator and the second fiber optic penetrator may be adapted to enable an optical communications signal to pass through the first atmospheric housing; and the third fiber optic penetrator and the fourth fiber optic penetrator may be adapted to enable an optical communications signal to pass through the second atmospheric housing. The system may comprise a flying lead, the flying lead harness comprising: a first connector end adapted to connect to a subsea control module, a second connector end adapted to connect to a sensor, the first optical converter, the second optical converter, and the fiber optic cable; wherein the first optical converter module, the fiber optic cable, and the second optical converter module are electronically disposed between the first and second connector ends; and wherein the first connector end is in electrical communication with the first optical converter module and the second connector end is in electrical communication with the second optical converter module.

In a second embodiment, the present invention provides a subsea control area network ("CAN") system adapted to provide CAN signal communication and electrical power from a subsea control module to a sensor over a fiber optic cable, the system comprising: a flying lead harness comprising a first connector end, a second connector end, a first optical converter, a second optical converter, and the fiber optic cable, the flying lead harness further comprising wherein: the first optical converter and the second optical converter each comprise an atmospheric housing adapted to withstand high differential pressures and provide an approximately one atmosphere interior pressure; the first optical converter is connected to the second optical converter by the fiber optic cable; the first optical converter, the second optical converter, and the fiber optic cable are disposed between the first connector end and the second connector end; the first optical converter is in electrical communication with the first connector end; the second optical converter is in electrical communication with the second connector end; the first connector end is adapted to connect to the subsea control module; and the second connector end is adapted to connect to the sensor; and the first optical converter is adapted to receive a first electrical CAN signal and electrical power over a first set of wires from the subsea control module; the first optical converter is adapted to convert the first electrical CAN signal into a first optical CAN signal and the electrical power into an optical electrical power signal for transmission via the fiber optic cable to the second optical converter; the second optical converter is adapted to receive the first optical CAN signal and the optical electrical power signal, and to convert the first optical CAN signal into a second electrical CAN signal and the optical electrical power signal into an electrical power output for transmission via a second set of wires to the sensor.

The system of the second embodiment may further comprise wherein: the first optical converter comprises a signal module and a power module; and the second optical converter comprises a signal module and a power module. The power module of the first optical converter may further comprise a set of high power laser diode drivers. The power module of the second optical converter may further comprise a current to voltage converter circuit, a capacitor bank, and a sensor power unit. The subsea control module may further comprise a power supply and a CAN bus module, the power supply adapted to provide the electrical power to the first optical converter, the CAN bus module providing the first electrical CAN signal to the first optical converter. The sensor may further comprise at least one electrical instrument and a CAN bus module, the CAN bus module adapted to communicate by the second electrical CAN signal with the second optical converter, the at least one electrical instrument connected to and powered by the electrical power output of the second optical converter. The system may further comprise wherein: a first fiber optic penetrator and a second fiber optic penetrator adapted to enable the first optical CAN signal to pass through the atmospheric housing of the first optical converter; and a third fiber optic penetrator and a fourth fiber optic penetrator adapted to enable the first optical CAN signal to pass through the atmospheric housing of the second optical converter.

Other features and advantages of the present invention should be apparent from the following description which illustrates, by way of example, aspects of the invention.

BRIEF DESCRIPTION OF THE DRAWINGS

In order to facilitate a complete understanding of the present invention, this system, and the terms used, reference is now made to the accompanying drawings, in which like elements are referenced with like numerals. These drawings should not be construed as limiting the present invention or system, but are exemplary and for reference.

DETAILED DESCRIPTION

The present invention and system will now be described in more detail with reference to exemplary embodiments as shown in the accompanying drawings. While the present invention and system is described herein with reference to the exemplary embodiments, it should be understood that the present invention and system is not limited to such exemplary embodiments. Those possessing ordinary skill in the art and having access to the teachings herein will recognize additional implementations, modifications, and embodiments as well as other applications for use of the invention and system, which are fully contemplated herein as within the scope of the present invention and system as disclosed and claimed herein, and with respect to which the present invention and system could be of significant utility.

Figure 1:
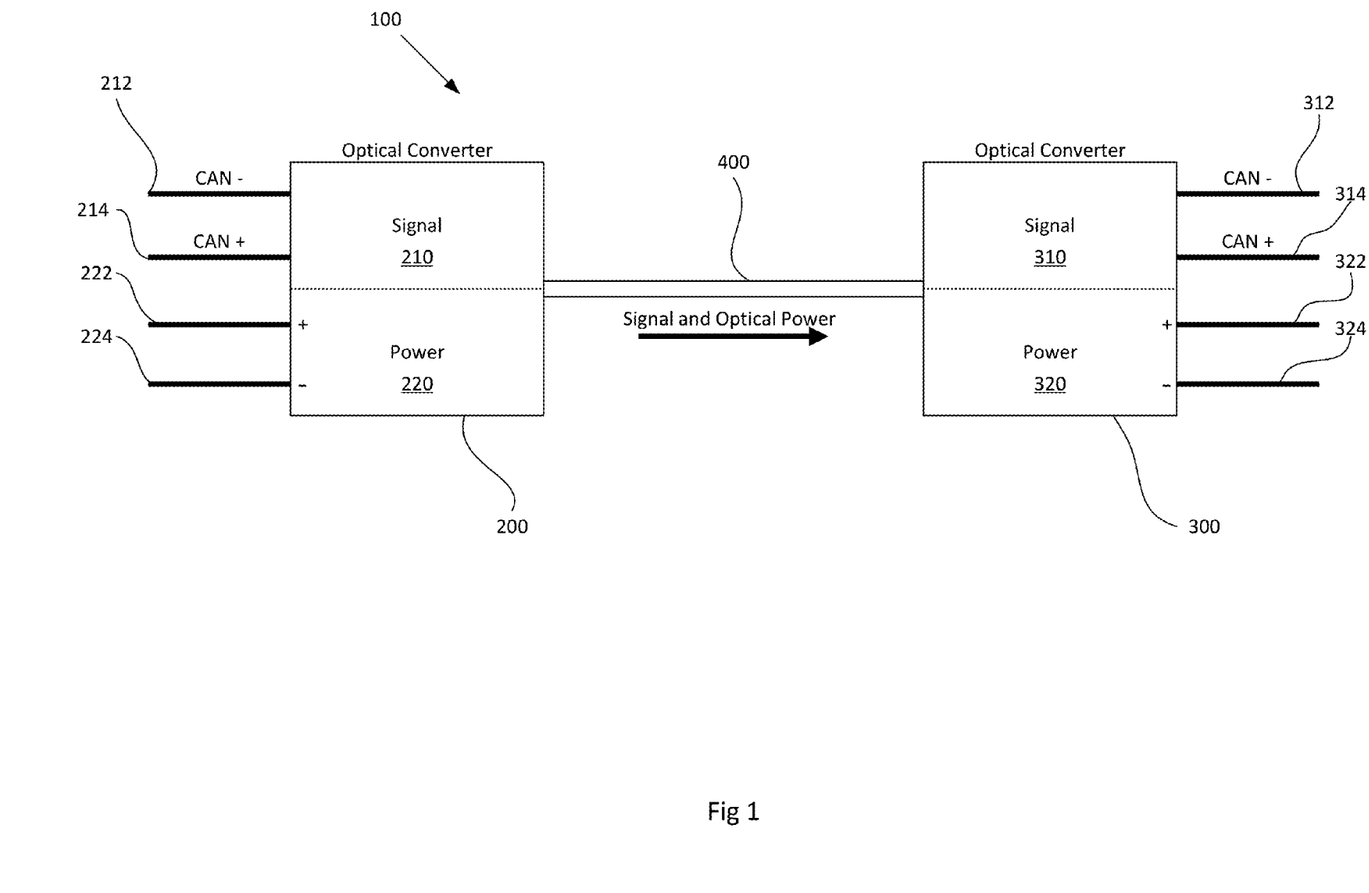
FIG. 1 is a block diagram of a subsea power-over-fiber CAN bus converter according to one embodiment of the present invention.

With reference first to FIG. 1, a block diagram of a subsea power-over-fiber CAN bus converter 100 according to one embodiment of the present invention is provided. The subsea power-over-fiber CAN bus converter 100 comprises the first optical converter module 200, the second optical converter module 300, and a fiber optic cable 400. The first optical converter module 100 comprises a signal module 210 and a power module 220. The second optical converter module 300 comprises a signal module 310 and a power module 320. The signal modules 210 and 310 and the power modules 220 and 320 may be electrical components including microchips and microprocessors on printed circuit boards or may be single integrated circuit components. The signal modules 210 and 310 and the power modules 220 and 320 may be single component modules with all functional elements fully integrated or may be a plurality of components in electrical communication with one another.

The signal module 210 of the first optical converter module receives as an input electrical CAN signals CAN− 212 and CAN+ 214. These electrical CAN signals CAN− 212 and CAN+ 214 are converted by the signal module 210 into an optical CAN signal for transmission via an optical fiber in the fiber optic cable 400 to the signal module 310 of the second optical converter module 300. The power module 220 has positive electrical 222 and negative or ground electrical 224 power inputs. These electrical power inputs 222 and 224 provide electrical power to the first optical converter module 200. The power module 220 also converts the electrical power into an optical signal for transmission via an optical fiber of the fiber optic cable 400 to the power module 320 of the second optical converter module 300.

The second optical converter module 300 receives the optical CAN signal and the optical power signal via optical fibers in the fiber optic cable 400. The signal module 310 converts the optical CAN signal input into an electrical CAN signal output for transmission via the CAN− 312 and CAN+ 314 outputs to a sensor or other subsea device. The power module 320 receives the optical power signal from an optical fiber in the fiber optic cable 400 and converts the optical power signal, by a photodetector such as photodetector 325 shown in FIG. 2, into an electrical power output signal usable by a sensor or other subsea device connected to positive electrical 322 and negative electrical 324 outputs.

Figure 2:
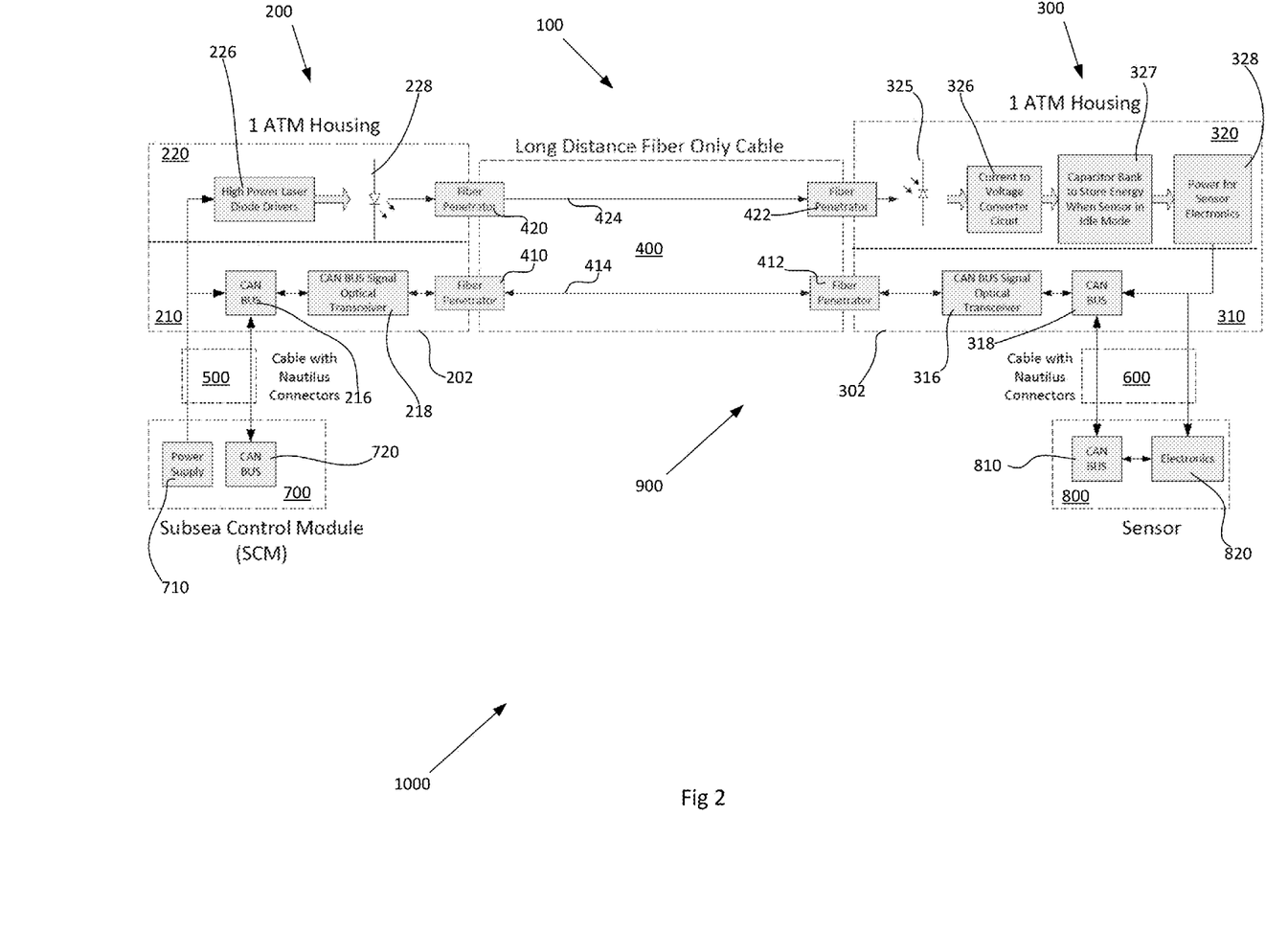
FIG. 2 is a block diagram of a subsea CAN bus network comprising a subsea power-over-fiber CAN bus converter according to the present invention.

With reference now to FIG. 2, a block diagram of a subsea CAN bus network 1000 according to the present invention is provided. The subsea CAN bus network 1000 comprises a subsea power-over-fiber CAN bus converter 100 in a flying lead harness 900 connecting a subsea control module 700 to a sensor 800. The first optical converter module 200 of the subsea power-over-fiber CAN bus converter 100 comprises a power module 220 and a signal module 210 disposed within an atmospheric housing 202. The second optical converter module 300 of the subsea power-over-fiber CAN bus converter 100 comprises a power module 320 and a signal module 310 disposed within an atmospheric housing 302. The atmospheric housings 202 and 302 protect the circuits, modules, and/or components of the first optical converter module 200 and second optical converter module 300 respectively. The atmospheric housings 202 and 302 prevent high external pressures and extreme external temperatures from affecting the first optical converter module 200 and second optical converter module 300 respectively. Additionally, the atmospheric housings 202 and 302 maintain a stable internal pressure of approximately one Atmosphere and may be oil filled or filled with any other suitable pressure compensating non-conductive fluid.

The flying lead harness 900 comprises a first connector end 500 which comprises an electrical cable and a Teledyne Nautilus type connector (e.g., Teledyne ODI Nautilus Rolling Seal Hybrid Connector (http://www.teledyneoilandgas.com/product/nautilus-rolling-seal-hybrid-nrh-connector.htm) or Teledyne ODI Angled Physical Contact Rolling Seal Connector (http://www.teledyneoilandgas.com/product/apc-rolling-seal-connector.htm)), or other similar suitable connector capable of functioning in extreme pressure and temperature conditions (e.g., connectors such as those described in U.S. Pat. Nos. 4,616,900; 4,682,848; 4,795,359; 5,194,012; 5,685,727; 5,738,535; 5,645,442; 5,838,857; 6,315,461; 6,736,545; and 7,695,301; each of which is incorporated by reference herein in their entirety) and a first optical converter module 200, a fiber optic cable 400, a second optical converter module 300, and a second connector end 600 which comprises an electrical cable and a Teledyne Nautilus type connector or other similar suitable connector capable of function in extreme pressure and temperature conditions. The subsea control module 700 comprises a power supply 710 and a CAN bus module 720. The sensor 800 comprises at least one electrical instrument 820 which may be part of an electronics or instrument package that may also include power management circuits and a CAN bus module 810.

The fiber optic cable 400 disposed between the first optical converter module 200 and the second optical converter module 300 comprises a first optical fiber 414 and a second optical fiber 424. The first optical fiber 414 passes signals through the atmospheric housing 202 through fiber penetrator 410 and passes signals through the atmospheric housing 302 through fiber penetrator 412. The second optical fiber 424 passes signals through the atmospheric housing 202 through fiber penetrator 420 and passes signals through the atmospheric housing 302 through fiber penetrator 422. The fiber penetrators 410, 412, 420, and 422 may be any suitable bulkhead penetrators capable of withstanding high temperature and differential pressures and extreme pressures while providing for optical communication through a bulkhead or atmospheric housing such as atmospheric housings 202 and 302.

The subsea control module 700 provides electrical power through the power supply 710 to the power module 220 of the first optical converter module 200. The power module 220 uses high power laser diode drivers 226 to power one or more laser diodes 228 which will emit a high power laser optical signal. The high power optical signal produced by the one or more laser diodes 228 is transmitted through the second optical fiber 424 of fiber optic cable 400 to the power module 320 of the second optical converter module 300. The power optical signal is received by at least one photodetector 325 which may comprise one or more photodiodes. The photodetector 325 may be a photovoltaic type photodetector capable of producing a voltage when illuminated with the power optical signal produced by the laser diodes 228. The current to voltage converter circuit 326 converts the voltage produced by the photodetector 325 into a current that is either stored in the capacitor bank 327 or sent by the sensor electronics power module 328 to a sensor 800. If the sensor 800 is in an idle or low power mode, the capacitor bank 327 may store the current produced by the photodetector 325 to provide immediate or additional power to the sensor 800 when required, such as on a sensor wakeup action. The sensor electric power module 328 provides an electrical power output that is provided to the electrical instruments 820 and the sensor CAN bus module 810 such that the sensor 800 may operate and receive or transmit CAN bus signals.

CAN bus signals are also transmitted optically from the subsea control module 700 to the sensor 800. The CAN bus module 720 of the subsea control module 700 produces an first electrical CAN signal that is received at the CAN bus module 216 of the first optical converter module 200. The CAN bus module 216 transmits the first electrical CAN bus signal to the CAN bus signal optical transceiver 218 which converts the first electrical CAN bus signal into a first optical CAN signal. The first optical CAN signal is transmitted by the CAN bus signal optical transceiver 218 via the first optical fiber 414 to the CAN bus signal optical transceiver 316 of the second optical converter module 300 through the fiber penetrators 410 and 412. The CAN bus signal optical transceiver 316 then converts the first optical CAN signal into a second electrical CAN signal. The second electrical CAN signal is then sent by the CAN bus module 318 to the CAN bus module 810 of the sensor 800. The process described above also occurs in reverse wherein the CAN signal originates at the sensor 800 and is transmitted through the second optical converter module 300 to the first optical converter module 200 and then to the subsea control module. In this manner, CAN signals may be sent over the CAN bus network between the subsea control module 700 and the sensor 800, and electrical power may be provided to the sensor 800 entirely through the fiber optic cable 400 over the first optical fiber 414 and second optical fiber 424.

Providing electrical power and CAN bus network signals over optical fibers greatly increases the distance at which the sensor 800 may be placed from the subsea control module 700 and reduces the costs associated with doing so as laying optical fiber on the seabed or sea floor is less expensive than laying conductive metal cables. Using optical fibers and optical signals also greatly reduces or eliminates problems that arise with the use of conductive metal cables including interference and signal loss. In another embodiment the first optical CAN signal and the optical electrical signal may be transmitted over a single or the same optical fiber instead of over the separate optical fibers 414 and 424 provided in FIG. 2.

Figure 3:
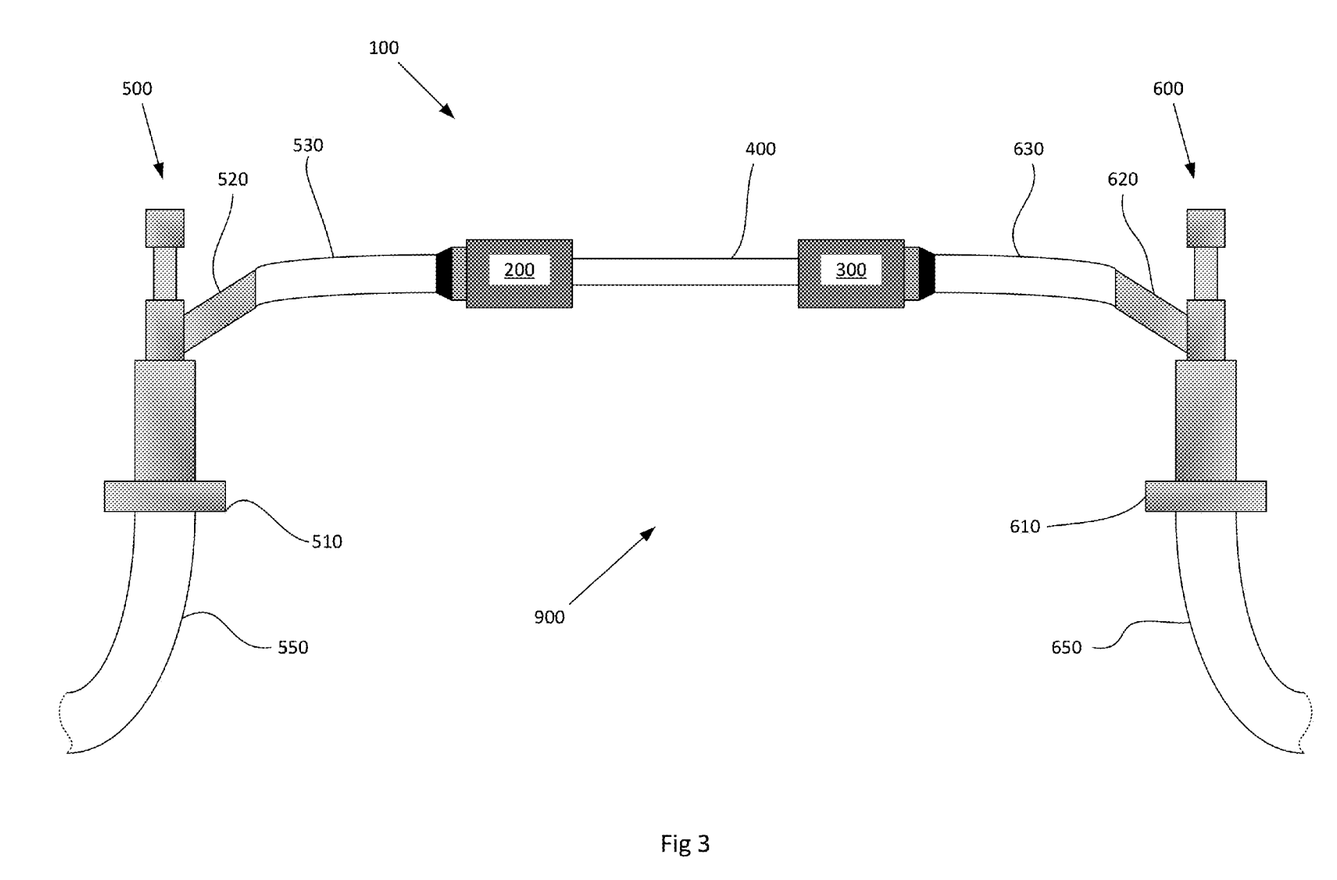
FIG. 3 is a diagram of a flying lead harness power-over-fiber CAN bus converter according to the present invention.

With reference now to FIG. 3, a diagram of a flying lead harness 900 comprising a first connector end 500, second connector end 600, and subsea power-over-fiber CAN bus converter 100 is provided. The first connector end 500 and second connector end 600 may be a Teledyne Nautilus type connector or other wet-mate type connector suitable for use in extreme temperature and pressure environments. The plug end 510 of the first connector end 500 connects to a socket of the electrical cable 550. The electrical cable 550 may carry electrical CAN signals and electrical power from a subsea device, such as the subsea control module 700 shown in FIG. 2, through the first connection end 500 to the first optical converter module 200 via the electrical cable 530. Strain relief/penetrator 520 provides for the connection of the electrical cable 530 to the electrical contacts in the plug end 510 of the first connection end 500. The plug end 610 of the second connector end 600 connects to a socket of the electrical cable 650. The electrical cable 650 may carry electrical CAN signals and electrical power through the second optical converter module 300 to the second connection end 600 via the electrical cable 630. Strain relief/penetrator 620 provides for the connection of the electrical cable 630 to the electrical contacts in the plug end 610 of the second connection end 600. The penetrators 520 and 620 may be any suitable electrical bulkhead penetrator capable of passing electrical power and electrical signals through to the electrical contacts of the first connection end 500 and second connection end 600 respectively. The first optical converter module 200 and second optical converter module 300 are disposed between the first connection end 500 and second connection end 600 and are connected by the fiber optic cable 400. The flying lead harness 900 is an entirely self-contained system that can convert electrical signal inputs and electrical power input into a set of optical signals for transmission over a fiber optic cable to be converted into electrical signal outputs and electrical power outputs for use by a subsea device such as the sensor 800 shown in FIG. 2.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A subsea power-over-fiber control area network ("CAN") bus converter system comprising:
    a first optical converter unit comprising a first signal module and a first power module, the first signal module comprising a first CAN bus and a first CAN bus signal optical transceiver, the first power module comprising a laser diode, wherein the first optical converter unit is disposed within a first atmospheric housing adapted to withstand high differential pressures;
    a second optical converter unit comprising a second signal module and a second power module, the second signal module comprising a second CAN bus and a second CAN bus signal optical transceiver, the second power module comprising at least one photodetector, wherein the second optical converter unit is disposed within a second atmospheric housing adapted to withstand high differential pressures; and
    a fiber optic cable comprising a first optical fiber and a second optical fiber, the first optical fiber connected at a first end to the first signal module through the first atmospheric housing by a first fiber penetrator and at a second end to the second signal module through the second atmospheric housing by a second fiber penetrator, the second optical fiber connected at a first end to the first power module through the first atmospheric housing by a third fiber penetrator and at a second end to the second power module through the second atmospheric housing by a fourth fiber penetrator.

2. The system of claim 1 wherein the first power module further comprises a set of high power laser diode drivers.

3. The system of claim 1 wherein the second power module further comprises a current to voltage converter circuit, a capacitor bank, and a sensor power unit.

4. The system of claim 1 further comprising a subsea control module and a sensor.

5. The system of claim 4 wherein the subsea control module further comprises a power supply and a CAN bus module, the power supply adapted to provide power to the first power module of the first optical converter, the CAN bus module providing a first electrical CAN signal to the first signal module of the first optical converter.

6. The system of claim 5 wherein the sensor further comprises at least one electrical instrument and a CAN bus module, the CAN bus module adapted to communicate by a second electrical CAN signal with the second signal module of the second optical converter, the at least one electrical instrument connected to and powered by the second power module of the second optical converter.

7. The system of claim 6 wherein the second optical converter module is adapted to:
receive the first optical CAN signal;
convert the first optical CAN signal into the second electrical CAN signal; and
transmit the second electrical CAN signal to the sensor.

8. The system of claim 5 wherein the first optical converter module is adapted to:
receive the first electrical CAN signal from the subsea control module;
convert the first electrical CAN signal into a first optical CAN signal; and
transmit the first optical CAN signal to the second optical converter module.

9. The system of claim 4 wherein the system is adapted to send and receive a set of CAN signals from the subsea control module to the sensor via the first optical converter module, the second optical converter module, and the fiber optic cable.

10. The system of claim 1 wherein the laser diode of the first optical converter module is adapted to emit a laser light via the fiber optic cable that when received at the at least one photodetector in the second optical converter module is converted into an electrical current.

11. The system of claim 10 wherein the electrical current is used to power a sensor without the use of an additional electrical power source.

12. The system of claim 1 wherein:
the first fiber optic penetrator and the second fiber optic penetrator are adapted to enable an optical communications signal to pass through the first atmospheric housing; and
the third fiber optic penetrator and the fourth fiber optic penetrator are adapted to enable an optical communications signal to pass through the second atmospheric housing.

13. The system of claim 1 further comprising a flying lead, the flying lead harness comprising:
a first connector end adapted to connect to a subsea control module, a second connector end adapted to connect to a sensor, the first optical converter, the second optical converter, and the fiber optic cable;
wherein the first optical converter module, the fiber optic cable, and the second optical converter module are electronically disposed between the first and second connector ends; and
wherein the first connector end is in electrical communication with the first optical converter module and the second connector end is in electrical communication with the second optical converter module.

14. A subsea control area network ("CAN") system adapted to provide CAN signal communication and electrical power from a subsea control module to a sensor over a fiber optic cable, the system comprising:
a flying lead harness comprising a first connector end, a second connector end, a first optical converter, a second optical converter, and the fiber optic cable, the flying lead harness further comprising wherein:
the first optical converter and the second optical converter each comprise an atmospheric housing adapted to withstand high differential pressures and provide an approximately one atmosphere interior pressure;
the first optical converter is connected to the second optical converter by the fiber optic cable;
the first optical converter, the second optical converter, and the fiber optic cable are disposed between the first connector end and the second connector end;
the first optical converter is in electrical communication with the first connector end;
the second optical converter is in electrical communication with the second connector end;
the first connector end is adapted to connect to the subsea control module; and
the second connector end is adapted to connect to the sensor;
the first optical converter is adapted to receive a first electrical CAN signal and electrical power over a first set of wires from the subsea control module;
the first optical converter is adapted to convert the first electrical CAN signal into a first optical CAN signal and the electrical power into an optical electrical power signal for transmission via the fiber optic cable to the second optical converter;
the second optical converter is adapted to receive the first optical CAN signal and the optical electrical power signal, and to convert the first optical CAN signal into a second electrical CAN signal and the optical electrical power signal into an electrical power output for transmission via a second set of wires to the sensor;
a first fiber optic penetrator and a second fiber optic penetrator adapted to enable the first optical CAN signal to pass through the atmospheric housing of the first optical converter; and
a third fiber optic penetrator and a fourth fiber optic penetrator adapted to enable the first optical CAN signal to pass through the atmospheric housing of the second optical converter.

15. The system of claim 14 further comprising wherein:
the first optical converter comprises a signal module and a power module; and
the second optical converter comprises a signal module and a power module.

16. The system of claim 15 wherein the power module of the first optical converter further comprises a set of high power laser diode drivers.

17. The system of claim 15 wherein the power module of the second optical converter further comprises a current to voltage converter circuit, a capacitor bank, and a sensor power unit.

18. The system of claim 14 wherein the subsea control module further comprises a power supply and a CAN bus module, the power supply adapted to provide the electrical power to the first optical converter, the CAN bus module providing the first electrical CAN signal to the first optical converter.

19. The system of claim 18 wherein the sensor further comprises at least one electrical instrument and a CAN bus module, the CAN bus module adapted to communicate by the second electrical CAN signal with the second optical converter, the at least one electrical instrument connected to and powered by the electrical power output of the second optical converter.

20. A subsea control area network ("CAN") system adapted to provide CAN signal communication and electrical power from a subsea control module to a sensor over a fiber optic cable, the system comprising:
a flying lead harness comprising a first connector end, a second connector end, a first optical converter, a second optical converter, and the fiber optic cable, the flying lead harness further comprising wherein:
the first optical converter and the second optical converter each comprise an atmospheric housing adapted to withstand high differential pressures and provide an approximately one atmosphere interior pressure;
the first optical converter is connected to the second optical converter by the fiber optic cable;
the first optical converter, the second optical converter, and the fiber optic cable are disposed between the first connector end and the second connector end;
the first optical converter is in electrical communication with the first connector end;
the second optical converter is in electrical communication with the second connector end;
the first connector end is adapted to connect to the subsea control module; and
the second connector end is adapted to connect to the sensor;
the first optical converter is adapted to receive a first electrical CAN signal and electrical power over a first set of wires from the subsea control module;
the first optical converter is adapted to convert the first electrical CAN signal into a first optical CAN signal and the electrical power into an optical electrical power signal for transmission via the fiber optic cable to the second optical converter;
the second optical converter is adapted to receive the first optical CAN signal and the optical electrical power signal, and to convert the first optical CAN signal into a second electrical CAN signal and the optical electrical power signal into an electrical power output for transmission via a second set of wires to the sensor;
the subsea control module further comprising a power supply and a CAN bus module, the power supply adapted to provide the electrical power to the first optical converter, the CAN bus module providing the first electrical CAN signal to the first optical converter; and
the sensor further comprising at least one electrical instrument and a CAN bus module, the CAN bus module adapted to communicate by the second electrical CAN signal with the second optical converter, the at least one electrical instrument connected to and powered by the electrical power output of the second optical converter.

* * * * *